US012469621B1

(12) United States Patent
Rogers

(10) Patent No.: US 12,469,621 B1
(45) Date of Patent: Nov. 11, 2025

(54) # FIRE RESISTANT RADIATING COAXIAL CABLE

(71) Applicant: American Fire Wire, Inc., Minden, NV (US)

(72) Inventor: William E. Rogers, Danville, CA (US)

(73) Assignee: American Fire Wire, Inc., Minden, NV (US)

( * ) Notice: Subject to any disclaimer, the term of this patent is extended or adjusted under 35 U.S.C. 154(b) by 0 days.

(21) Appl. No.: 18/894,981

(22) Filed: Sep. 24, 2024

(51) Int. Cl.

| | |
|---|---|
| ***H01B 7/295*** | (2006.01) |
| ***H01B 3/12*** | (2006.01) |
| ***H01B 3/47*** | (2006.01) |
| ***H01B 5/12*** | (2006.01) |
| ***H01B 7/02*** | (2006.01) |
| ***H01B 7/18*** | (2006.01) |
| ***H01B 11/18*** | (2006.01) |
| ***H01B 13/06*** | (2006.01) |

(52) U.S. Cl.
CPC ............... *H01B 7/295* (2013.01); *H01B 3/12* (2013.01); *H01B 3/47* (2013.01); *H01B 5/12* (2013.01); *H01B 7/0266* (2013.01); *H01B 7/184* (2013.01); *H01B 7/1875* (2013.01); *H01B 11/1847* (2013.01); *H01B 13/067* (2013.01)

(58) Field of Classification Search
CPC ............. H01B 7/295; H01B 3/08; H01B 3/10
USPC ...................................................... 174/121 A
See application file for complete search history.

(56) References Cited

U.S. PATENT DOCUMENTS

| | | | | |
|---|---|---|---|---|
| 3,299,202 | A | 1/1967 | Brown | |
| 3,567,846 | A | 3/1971 | Brorein et al. | |
| 3,590,141 | A | 6/1971 | Mildner | |
| 3,823,255 | A | 7/1974 | La Gase et al. | |
| 3,903,354 | A | 9/1975 | Dageforde | |
| 4,391,425 | A | 7/1983 | Keep, Jr. | |
| 5,227,586 | A | 7/1993 | Beauchamp | |
| 5,262,593 | A | 11/1993 | Madry et al. | |
| 5,422,614 | A * | 6/1995 | Rampalli | H01Q 13/203 333/237 |
| 5,457,285 | A | 10/1995 | Faust et al. | |

(Continued)

FOREIGN PATENT DOCUMENTS

| | | |
|---|---|---|
| CN | 201421874 | 3/2010 |
| CN | 202384468 | 8/2012 |

(Continued)

OTHER PUBLICATIONS

"2-Hour Fire-Rated, Mineral Insulated Copper Sheathed Wiring Cable", Pentair, Pyrotenax System 1850, Jul. 2015, 6 pages.

(Continued)

*Primary Examiner* — Chau N Nguyen
(74) *Attorney, Agent, or Firm* — Mark P. Mathison

(57) ABSTRACT

A fire resistant radiating coaxial cable that employs a high-silica fiberglass yarn spacer is described. The yarn material has mass fraction of silica ($SiO_2$) between 95.0% and 96.5%, a mass fraction of aluminum oxide ($Al_2O_3$) greater than 3%, and a mass fraction of calcium oxide (CaO) less than 0.5%. The yarn can be wound in a low-helix-angle helix around the center conductor such that less than half fills the annular space between it and the outer conductor. The cable is configured to maintain a relatively coaxial relation between a center conductor and an outer conductor under intense fire conditions.

20 Claims, 7 Drawing Sheets

(56) References Cited

U.S. PATENT DOCUMENTS

| | | | | |
|---|---|---|---|---|
| 5,714,421 | A | 2/1998 | Olds et al. | |
| 6,049,647 | A | 4/2000 | Register et al. | |
| 6,387,518 | B1 | 5/2002 | Wolfer et al. | |
| 7,304,245 | B2 | 12/2007 | Alexander et al. | |
| 7,470,641 | B2 | 12/2008 | Jubb et al. | |
| 7,538,275 | B2 | 5/2009 | Konnik et al. | |
| 7,652,090 | B2 | 1/2010 | Alexander et al. | |
| 7,875,566 | B2 | 1/2011 | Freeman et al. | |
| 9,449,741 | B2 | 9/2016 | Abe et al. | |
| 9,450,352 | B2 | 9/2016 | Miyawaki | |
| 9,773,565 | B1 | 9/2017 | Yeh | |
| 9,773,585 | B1 | 9/2017 | Rogers | |
| 10,283,239 | B2 | 5/2019 | Rogers | |
| 10,726,974 | B1 | 7/2020 | Rogers | |
| 11,145,440 | B2 | 10/2021 | Rogers | |
| 11,450,456 | B1 * | 9/2022 | Evans | G02B 6/4416 |
| 2001/0044370 | A1 * | 11/2001 | Crane | H01J 61/40 501/64 |
| 2003/0055157 | A1 | 3/2003 | Wolfer et al. | |
| 2005/0183878 | A1 * | 8/2005 | Herbort | H01B 7/295 174/116 |
| 2006/0175074 | A1 | 8/2006 | Huffman | |
| 2008/0093107 | A1 | 4/2008 | Amigouet et al. | |
| 2008/0277320 | A1 * | 11/2008 | Thiel | H05B 3/84 209/203 |
| 2010/0101824 | A1 | 4/2010 | Fujimoto et al. | |
| 2011/0209892 | A1 | 9/2011 | Metz et al. | |
| 2011/0247839 | A1 | 10/2011 | Lalouch et al. | |
| 2013/0299211 | A1 | 11/2013 | Pope | |
| 2013/0336623 | A1 * | 12/2013 | Chamberlain | G02B 6/4416 385/101 |
| 2014/0037956 | A1 | 2/2014 | Sopory | |
| 2015/0060106 | A1 | 3/2015 | Polasky | |
| 2015/0206625 | A1 | 7/2015 | Kumada | |
| 2015/0318675 | A1 | 11/2015 | Olsson et al. | |
| 2016/0002096 | A1 * | 1/2016 | Carrilero | C30B 29/06 428/141 |
| 2016/0093419 | A1 | 3/2016 | Shin et al. | |
| 2018/0174710 | A1 | 6/2018 | Rogers | |
| 2020/0126690 | A1 | 4/2020 | Sirin et al. | |
| 2020/0211739 | A1 | 7/2020 | Elsaadani et al. | |
| 2021/0233682 | A1 | 7/2021 | Elsaadani et al. | |

FOREIGN PATENT DOCUMENTS

| | | | |
|---|---|---|---|
| CN | 103753927 | | 4/2014 |
| CN | 105913951 | | 8/2016 |
| CN | 107768003 | | 3/2018 |
| JP | 11297128 | | 10/1999 |
| JP | 2012204089 | A | 10/2012 |

OTHER PUBLICATIONS

"3M™ Nextel™ Ceramic Fibers and Textiles", 3M Science Applied to Life, Available at http://www.3m.com/3M/en-US/company-us/all-3m-products/-/All-3M-Products/Chemicals-Advanced-Materials/Advanced-Ceramics/Ceramic-Fibers-and-Textiles, Nov. 9, 2016, 11 pages.

"Alsecure® Premium Multicore", Nexans Olex, Alsecure® Premium Multicore Ceramifiable®, Available at http://www.olex.com.au, Nov. 19, 2016, 2 pages.

"Ceram Polymerik—The World's Hottest Company in Fire Protection Technology", Global Intelligence of Fire Protection Industry Worldwide, Market Analysis of Projects and Developments, Fire Prevention-Active and Passive Fire Protection, Press Room Available at http://hkc22.com/fireprotectionindustry_pressroom_ceram_polymerik.html, Accessed from Internet on Nov. 18, 2016, 3 pages.

"Ceramifiable Silicone Rubber Compound for Fire Resistant Cable", Anpin Silicone Material Co., Ltd., Available at http://anpin.en.explaza.net/ceramifiable-silicone-rubber-compund-for--94686-3590090.html, Accessed from Internet on Sep. 26, 2016, 3 pages.

"Fire-Resistant Cables", Fanton, 2007-2008, 1 page.

"Korean Ceramifiable® Cables That Can Take the Heat", Nexans, Available at http://www.nexans.com/eservice/navigation/NavigationPublicationOnly.nx?forPrint=true&publicationId=-33641, Accessed from Internet on Nov. 18, 2016, 1 page.

Di et al., "A Novel EVA Composite With Simultaneous Flame Retardation and Ceramifiable Capacity", RSC Advances, vol. 5, Issue 83, 2015, 2 pages.

Wilson et al., "Circuit Integrity Cable Re-Examined", Available Online At: http://www.csemag.com/industry-new/codes-and-standards-updates/single-article/circuit-integrity-cable-reexamined/09dde6e6e9f8cc2e5c90c024f3825d3b.html, Mar. 1, 2002, 2 pages.

Johnson , "Foam Heliax—A new foam coaxial cable", IRE Transactions on Vehicular Communications, vol. VC-11, No. 1, Aug. 1962, pp. 1-3.

"Zetex Fiberglass Rope," Newtex, Available Online At: https://www.newtex.com/npm/ropes-sleeves/ropes/ceramic-ropes, last accessed Sep. 13, 2024, 5 pages.

"Ceramic Ropes," Newtex, Available Online At: https://www.newtex.com/npm/ropes-sleeves/ropes/fiberglass-ropes, last accessed Sep. 13, 2024, 4 pages.

* cited by examiner

FIRE RESISTANT RADIATING COAXIAL CABLE

CROSS-REFERENCES TO RELATED APPLICATIONS

NOT APPLICABLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present application generally relates to communication cables or conductors, including coaxial cables constructed with helical wrapped or other structures between the conductors. Specifically, the application is related to fire-resistant radiating and other coaxial cable with a high-temperature, high silica fiberglass yarn and air dielectric.

2. Description of the Related Art

Radiating cable, sometimes referred to as "leaky feeder," is coaxial cable that has holes in the outer conductor. The holes allow radio frequency (RF) electromagnetic radiation to escape from or enter into the dielectric area between the inner and outer conductors and be transported along its length. A common use case for radiating cable is, effectively, as a long, flexible antenna for wireless communications.

Where clear lines-of-sight cannot otherwise be assured between discrete antennas and moving radios is where radiating cables excel. Blocked paths may occur in ship hulls or warehouse cranes, where the ebb and flow of stacked, stored, often metallic goods may occlude antennas. Radiating cable also finds use where signal strength must be as predictable and uniform as possible, such as for safety-critical applications. Factory conveyor belts and manufacturing lines, baggage handling systems, and roller coaster safety systems are some such applications. But across the world, radiating cable finds its most ubiquitous use in vehicle tunnels, elevator shafts, mines, and other confined spaces.

During a fire in a confined space, it is sometimes critical to keep communications working, which helps survivors evacuate and first responders coordinate with each other.

A cellular distributed antenna system (DAS) is often employed within buildings and confined spaces in order to facilitate transmission of signals between occupants' cell phones and local cell towers. An Emergency Responder Radio Coverage System (ERRCS) DAS may also be employed within facilities. An ERRCS DAS boosts radio signals for firemen, policemen, and other first responders, similarly to a cellular DAS.

Building fire codes require DASes to meet certain survivability standards. For example, fire codes sometimes dictate that communication cables connecting the DAS's antennas to the central processing/head-end rack and communication cables running from the rack to the outside antenna maintain operation at 1010° C. (1850° F.) temperatures for two hours. This standard can be found among the NFPA 72 (National Fire Alarm and Signaling Code), ICC IFC 510 (International Fire Code), and NFPA 1221 (Standard for the Installation, Maintenance, and Use of Emergency Services Communications Systems) codes.

There is a need in the art for radiating and other cable that is fire survivable with minimal signal loss.

BRIEF SUMMARY

Generally, a fire-resistant coaxial cable is described that has a high-silica ($SiO_2$) fiberglass yarn wrapped sparsely around its center conductor so as to leave more air than yarn. The yarn holds the center conductor centered within an outer conductor, effectively acting as a continuous spacer. The air, yarn threads, and air within the interstitial spaces between the threads serve as a dielectric between the center and outer conductors. The yarn threads have a high, greater-than-95% silica content that is enriched with over 3% aluminum oxide ($Al_2O_3$) and smaller mass fractions of sodium oxide ($Na_2O$), magnesium oxide (MgO), calcium oxide (CaO), ferric oxide ($Fe_2O_3$) and zirconium dioxide ($ZrO_2$), as outlined in the sections below.

The yarn can include multiple plies that are twisted or braided together so as to not only maintain its own rope-like form but, as wrapped in a continuous helix around the center conductor, maintain a predetermined dielectric spacing between the center conductor and the outer conductor when exposed to heat at or above 1010° C. The twisting or braiding not only supports its own shape, but it also maintains the centricity of the center conductor within the outer conductor when the cable is bent around corners.

Radiating coaxial cable may be made by manufacturing holes in the outer conductor either before or after it is rolled. For example, after rolling and corrugating it can be milled to expose the fiberglass yarn and air dielectric. The outer conductor can be corrugated, foil, and/or loose braid metal, among other configurations. The radiating cable may be connected to non-radiating cable in order to transport and receive RF signals in enclosed spaces where fire resistance is important to communications.

Some embodiments of the present invention are related to a fire resistant radiating coaxial cable apparatus including a center conductor, an outer conductor having a circumference with apertures, the outer conductor surrounding the center conductor, and a high silica fiberglass yarn between the center conductor and the outer conductor, the fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%, the fiberglass yarn being configured to maintain a predetermined dielectric spacing between the center conductor and the outer conductor when exposed to heat at or above 1010° C.

The fiberglass yarn can be wrapped in a helix around the center conductor. The helix can have an average helix angle of less than 60°. This can be plus or minus 10°. The yarn can fill less than half of a volume between the center conductor and the outer conductor. The yarn can fill less than a third of the volume between the center conductor and the outer conductor while being continuous through the cable.

The yarn can have two or more plies. The yarn can be a twisted or braided yarn. The fiberglass yarn can directly touch the center conductor and/or the outer conductor.

The high silica fiberglass yarn fibers can have a composition weight percentage of:

(a) $Na_2O$=0.0564%±0.0056%
(b) MgO=0.110%±0.011%
(c) $Al_2O_3$=3.55%±0.36%
(d) $SiO_2$=96.0%±1.0%
(e) CaO=0.116%±0.012%
(f) $Fe_2O_3$=0.164%±0.016%
(g) $ZrO_2$=0.0301±0.0030%.

The outer conductor can be corrugated, the apertures having been produced by milling, at a constant radius, protuberant portions of corrugations along length of the cable, the milling breaking through the outer conductor to expose the fiberglass yarn and air.

The outer conductor can be a metal foil with round or slotted holes and/or a loose braid, wherein the apertures are between metal strands of the loose braid.

The cable can include a ceramifiable silicone rubber inner jacket or a ceramic fiber wrap inner jacket surrounding the outer conductor. It can include a smooth outer jacket surrounding the inner jacket. The outer jacket can include an embossing or engraving aligned with the apertures, either 180° opposite or directly above (i.e., 0° from) the apertures.

Some embodiments are related to a fire resistant coaxial cable apparatus including a center conductor, an outer conductor surrounding the center conductor, and a high silica fiberglass yarn wrapped in a helix between the center conductor and the outer conductor, the fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%, the fiberglass yarn being configured to maintain a predetermined dielectric spacing between the center conductor and the outer conductor when exposed to heat at or above 1010° C., wherein the fiberglass yarn fills less than half of a volume between the center conductor and the outer conductor.

The outer conductor can have corrugations with apertures. The apertures can have been produced by milling, at a constant radius, protuberant portions of corrugations along a length of the cable, the milling breaking through the outer conductor to expose the fiberglass yarn.

Some embodiments relate to a method of manufacturing a fire resistant coaxial cable, the method including wrapping a center conductor with a helix of high silica fiberglass yarn, the fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%, and surrounding the fiberglass yarn and center conductor with an outer conductor, wherein the fiberglass yarn is configured to maintain a predetermined dielectric spacing between the center conductor and the outer conductor when exposed to heat at or above 1010° C.

The outer conductor can be corrugated. The method can further include milling, at a constant radius, apertures through protuberant portions of corrugations along longitudinal length of the cable, the milling breaking through the outer conductor to expose the fiberglass yarn.

Some embodiments relate to a method of installing a fire resistant radiating coaxial cable, the method including providing a coaxial cable having a center conductor around which a high silica fiberglass yarn is wound in a helix, the high silica fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%, the fiberglass yarn surrounded by an outer conductor having a circumference with apertures, the fiberglass yarn being configured to maintain a predetermined dielectric spacing between the center conductor and the outer conductor when exposed to heat at or above 1010° C. The method can include pulling or pushing the coaxial cable through a conduit and connecting the coaxial cable to an antenna of a distributed antenna system.

Some embodiments relate to a method of testing a fire resistant radiating coaxial cable, the method including providing a coaxial cable having a center conductor around which a high silica fiberglass yarn is wound in a helix, the high silica fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%, the fiberglass yarn surrounded by an outer conductor having a circumference with apertures, the fiberglass yarn being configured to maintain a predetermined dielectric spacing between the center conductor and the outer conductor when exposed to heat at or above 1010° C. The method can include subjecting the coaxial cable to heat at or above 1010° C., passing, after the subjecting, a radio frequency (RF) signal through the coaxial cable sufficient to emit the RF signal from the cable, and measuring an intensity of the signal emitted from the coaxial cable.

DETAILED DESCRIPTION

Figure 1A:
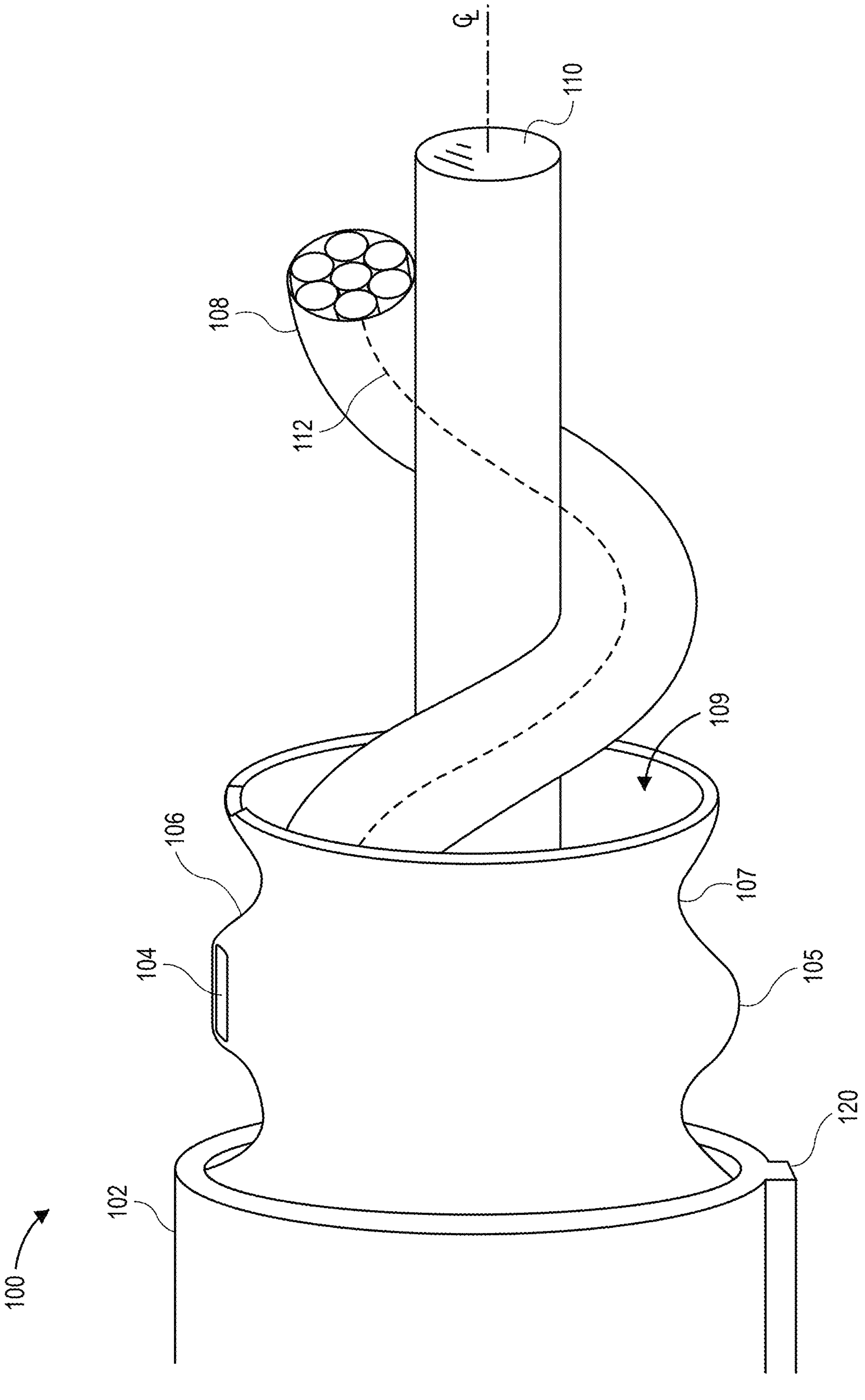
FIG. 1A is a cut-away perspective view of a corrugated coaxial cable in accordance with an embodiment.

Fire resistant coaxial cable that is radiating or non-radiating is manufactured by continuously wrapping a high-silica fiberglass composition yarn around a center conductor. The yarn acts as a spacer for a mostly air dielectric between the center and outer conductors. Some embodiments of the cable can survive two hours in fire conditions of 1010° C. (1850° F.), which is a common fire rating. Not only can they survive, but they can support transmission of radio frequency (RF) signal by maintaining relative concentricity of the center conductor under the intense heat.

A "yarn" includes multiple fiber threads and/or filaments that have been spun together so as to hold together longitudinally in long continuous strands, or as otherwise known in the art. The term, "yarn," can also refer to multiple strands or "plies" of smaller yarns that have been spun together to make 2-, 3-, or N-ply yarn. A single strand of yarn can be called a single-ply yarn. Plies of yarn can be simply twisted together or braided to form larger diameter yarn or ropes.

A "ceramifiable" material includes a material that turns from a flexible material into a ceramic when exposed to high temperatures, such as over 425° C., 482° C., 1010° C., or as otherwise known in the art. The material can be a composition of component materials that have different melting ranges. The lowest-melting temperature component materials may melt at 350° C. Between 425° C. and 482° C., other component materials of the material my devitrify, passing from a glass-like state into a crystalline state. Additives can bond refractory fillers together, forming a porous ceramic material. A material configured to convert from a resilient elastomer to a porous ceramic when heated above 425° C. can include initial, partial, or full conversion to ceramic when air temperatures surrounding it is heated above 425° C.

An example ceramifiable polymer may be the peroxidically crosslinking or condensation-crosslinking polymer described in U.S. Pat. No. 6,387,518.

A "ceramifiable silicone rubber" includes silicone polymer (polysiloxane) with additives that cause the material to turn into a fire-resistant ceramic in high temperature fire conditions, or as otherwise known in the art. This may include peroxide crosslinking or condensation-crosslinking high consistency silicone rubber. A silicone polymer matrix can include low-melting point inorganic flux particles and refractory filler particles in a polysiloxane matrix. Example products include, but are not limited to: Ceramifiable Silicone Rubber Compound RCS-821 manufactured by Shenzhen Anpin Silicone Material Col, Ltd. of Guangdong, China; ELASTOSIL® R 502/75 compound manufactured by Wacker-Chemie GmbH of Munich, Germany; and XIAMETER® RBC-7160-70 compound manufactured by Dow Corning Corporation of Midland, Michigan, United States of America.

Use of a ceramifiable silicone rubber can be seen and is described in U.S. Pat. Nos. 9,773,585 and 10,726,974, both of which are incorporated in their entirety by reference.

A "ceramic fiber wrap" includes a textile that includes microscopic ceramic fibers and fillers that maintain structural integrity at high temperatures. Example products include NEXTEL® ceramic fibers and textiles manufactured by 3M Corporation of Saint Paul, Minnesota, United States of America. 3M NEXTEL® textiles include aluminoborosilicate, aluminosilica, and alumina (aluminum oxide $Al_2O_3$) fibers with diameters ranging from 7 microns to 13 microns. Per the World Health Organization (WHO), fiber diameters above 3 microns (with length greater than 5 microns with a length-to-diameter ration greater than 3:1) are not considered respirable.

In some embodiments, the ceramic fiber wrap can include a glass substrate. The ceramic fiber wrap, for example, can be a multi-ply tape with a glass substrate and a layer of a phyllosilicate tape. An example product includes EIS® mica tape, manufactured by Isovolta. Mica tape manufactured by Isovolta includes calcined muscovite mica paper reinforced on one side with a glass cloth.

A "refractory" material includes non-metallic material having those chemical and physical properties that make them applicable for structures, or as components of systems, that are exposed to environments above 1,000° F. (811 K; 538° C.) (ASTM C71), or as otherwise known in the art.

A "low smoke zero halogen" or "low smoke free of halogen" (LSZH or LSOH or LSOH or LSFH or OHLS) is a material classification typically used for cable jacketing in the wire and cable industry. LSZH cable jacketing is composed of thermoplastic or thermoset compounds that emit limited smoke and no halogen when exposed to high sources of heat.

Cable jackets can also be made from polyvinyl chloride (PVC) or other suitable polymers.

A "radial thickness" includes a layer thickness, or as otherwise known in the art. On a circular cross-sectioned cable, the radial thickness is the distance along a radial line from the center of the circle from one point to another point. This is distinguished from a tangential, secant, axial, or other distance.

MYLAR® polyester film is trade name of E. I. du Pont de Nemours and Company, Wilmington, Delaware, U.S.A., for a biaxially-oriented polyethylene terephthalate (boPET) product.

Being "devoid or free" of water or another material includes having less than 10%, 9%, 8%, 7%, 6%, 5%, 4%, 3%, 2%, 1%, 0.5%, 0.1%, 0.05%, or 0.001% of the material within the item that is devoid or free of it, or as otherwise known in the art.

Figure 1B:
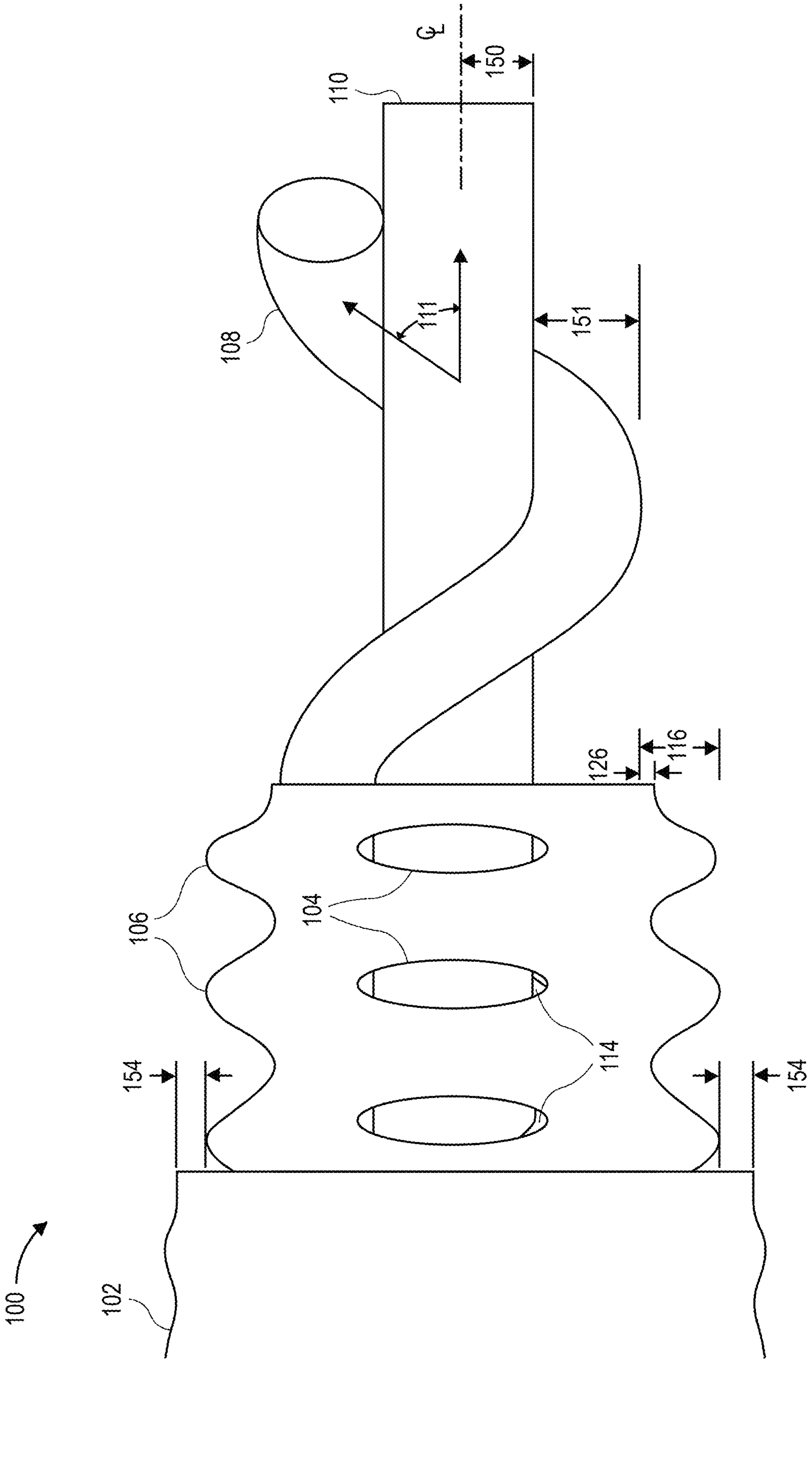
FIG. 1B is a cut-away top view of the corrugated coaxial cable of FIG. 1A.
Figure 1C:
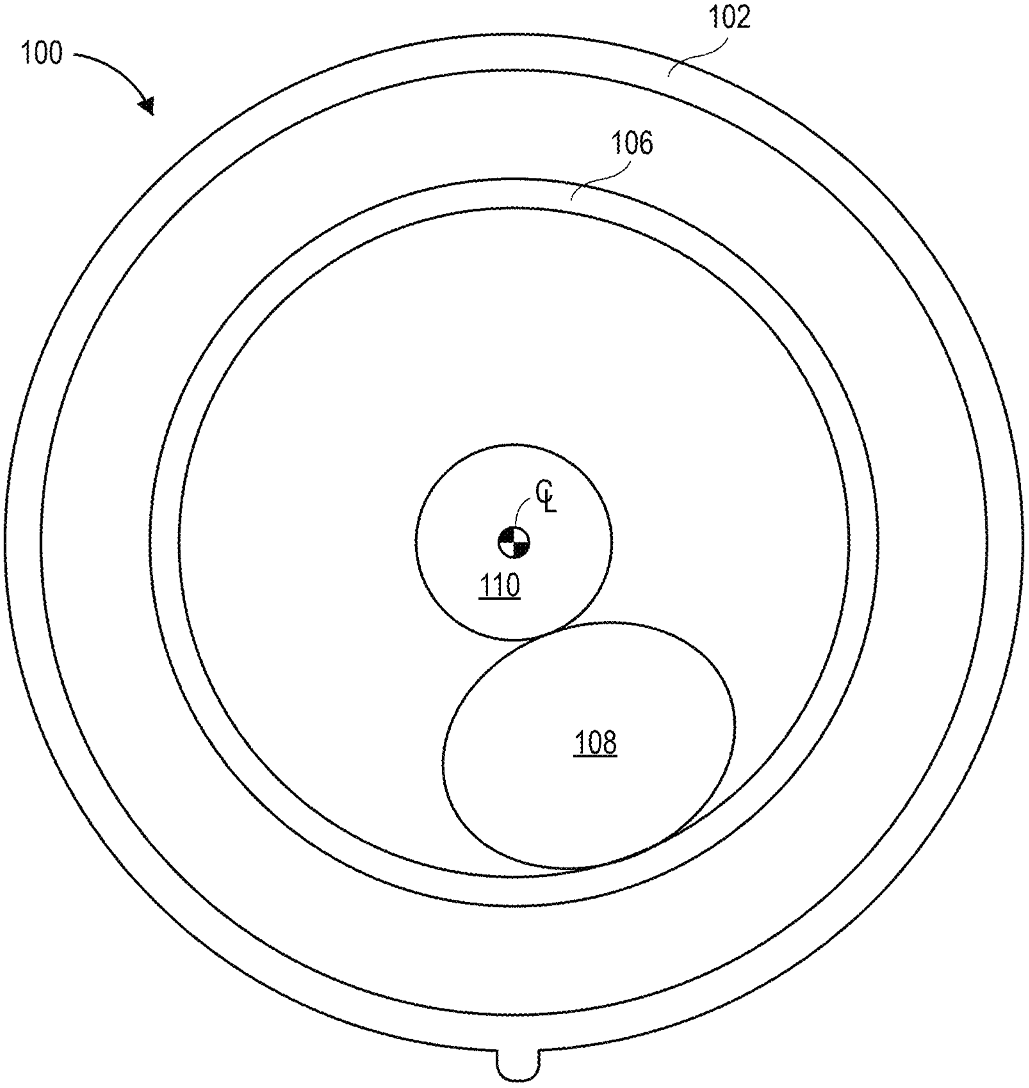
FIG. 1C is a lateral cross-section of the corrugated coaxial cable of FIG. 1A.

FIGS. 1A-C show a fire resistant radiating corrugated coaxial cable 100 in accordance with embodiments. The exemplary cable essentially has a round cross-section and is radially symmetric around axial centerline CL. The exemplary coaxial cable has a solid copper metal center conductor 110.

Center conductor 110 is a solid wire running the length of the coaxial cable 100. However, in some embodiments the center conductor may be composed of several smaller individual wires. Each individual wire may be bare, nickel-plated copper, or otherwise modified.

Wrapping around center conductor 110 in a helical shape 112 is high-silica fiberglass yarn 108. Helix shape 112 has helical angle 60°±10°. The fiberglass yarn has a mass fraction of silica ($SiO_2$) between 95.0% and 96.5%, a mass fraction of aluminum oxide ($Al_2O_3$) greater than 3%, and a mass fraction of calcium oxide (CaO) less than 0.5%.

An angular cross-section of the yarn is shown that indicates seven plies of yarn that are firmly, but not too tightly, braided together. Other numbers of plies of yarn, including single ply, can be used. Multiple plies can be twisted or braided together.

Surrounding the fiberglass yarn and center conductor is copper metal outer conductor 106. Outer conductor 106 is corrugated with protuberant portions 105 and narrower portions 107. The insides of the narrower portions bear against the outside of the helical fiberglass yarn. The yarn acts as a spacer to keep the center conductor concentric with the outer conductor.

Outer conductor 106 encloses an annular volume 109 between it and center conductor 110. Fiberglass yarn 108, being relatively thin and at a relatively low helical angle 111 (see FIG. 1B), fills about a third of volume 109. The fiberglass yarn directly touches both the inner and outer conductors. In other embodiments, mica tape or other layers may come between the fiberglass yarn and one or more conductors. In embodiments with wrappings at higher helical angles, the yarn may fill about a half of the annular volume.

Despite the low helical angle (<60°, sometimes 50°, sometimes)<70° and relatively hollow fill, the dimensions remain relatively stable when the cable is bent around a radius. In certain tests commissioned by the inventor, the center conductor movement was on the order of averaging 7-14% from the centerline.

The corrugated metal may be a 6.35 mm (0.25 inch) solid copper corrugated metal or otherwise. The corrugation of the outer conductor can be helical, such that a cross section is not symmetric along axial planes. In other embodiments, the outer conductor can be a metallic wrap.

Apertures 104 are formed in corrugated outer conductor 106. In FIG. 1A, an aperture is shown near the top of the figure, while in FIG. 1B, a top-down view shows a line of apertures facing out from the page. In the exemplary embodiment, apertures 104 were produced by milling, at a constant radius, protuberant portions 105 of corrugations along a length of the cable, the milling breaking through the outer conductor to expose the fiberglass yarn and air inside. In FIG. 1B, fiberglass yarn 114 can be seen through the "window" apertures.

In some embodiments, apertures may be laser cut or dye punched. They may be produced before or after the outer conductor is rolled or set in place. If the outer conductor is corrugated, the holes may be formed before or after corrugating.

Smooth PVC jacket 102 surrounds outer conductor 106. An embossed longitudinal line 120 is formed in the jacket to be aligned opposite the apertures. An embossed feature is traditional with radiating cables. In some embodiments, an engraved (recessed) line or other shape may be formed in the cable.

FIG. 1B shows various dimensions on the cable. Inner, center conductor 110 has radius 150. Corrugated outer conductor 106 has total thickness 116, which includes the corrugation undulations plus wall thickness 126. Distance 151 between inner wall of outer conductor 106 and outside surface of center conductor 110 is stabilized by yarn 108. Jacket 102 has wall thickness 154, shown symmetrically from the top view.

FIG. 1C is a cross section of the coaxial cable at a point in which the inner wall of a narrowed portion of the corrugations of outer conductor 106 bears against fiberglass yarn spacer 108. Fiberglass yarn 108 supports center conductor 110 so that it is more-or-less centered within the circular cross section of the outer conductor. This configuration is how the cable would be manufactured and installed. It is in this configuration that the cable optimally transports, transmits, and receives RF signal. A fire or other high temperature conditions may change the configuration, slightly.

Figure 2:
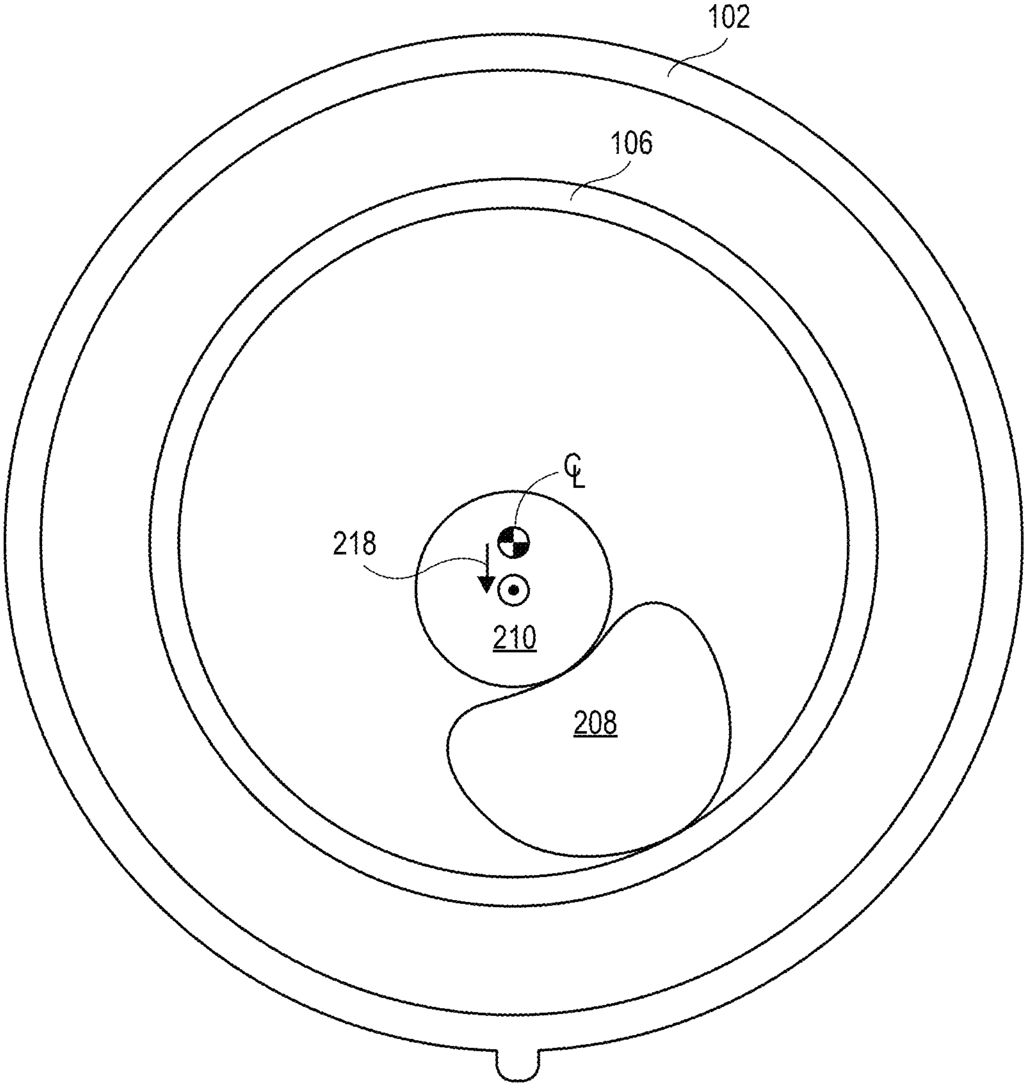
FIG. 2 is a lateral cross-section of the corrugated coaxial cable of FIG. 1C after being subjected to high temperatures, in accordance with an embodiment.

FIG. 2 is a lateral cross-section of the same corrugated coaxial cable of FIG. 1C after being subjected to high temperatures. The high content of silica in the fiberglass yarn has caused the yarn to pad and shift, albeit slightly (about 10% from center). The aluminum oxide in the fiberglass, however, not only helps dielectric performance but also supports the silica in the yarn. Yarn 208 shifts and compresses only slightly under the weight of center conductor 210 and perhaps other forces, such as bending moments from installation. Preferably, total movement 218 of center conductor 210 with respect to the center point of outer conductor 106 is relatively small, preserving concentricity of the coaxial cable.

Jacket 102 is shown in the figure but may have burned away. An inner jacket of ceramifiable silicone rubber or ceramic fiber wrap may keep outer conductor 106 from touching metal conduit or cable trays.

Figure 3:
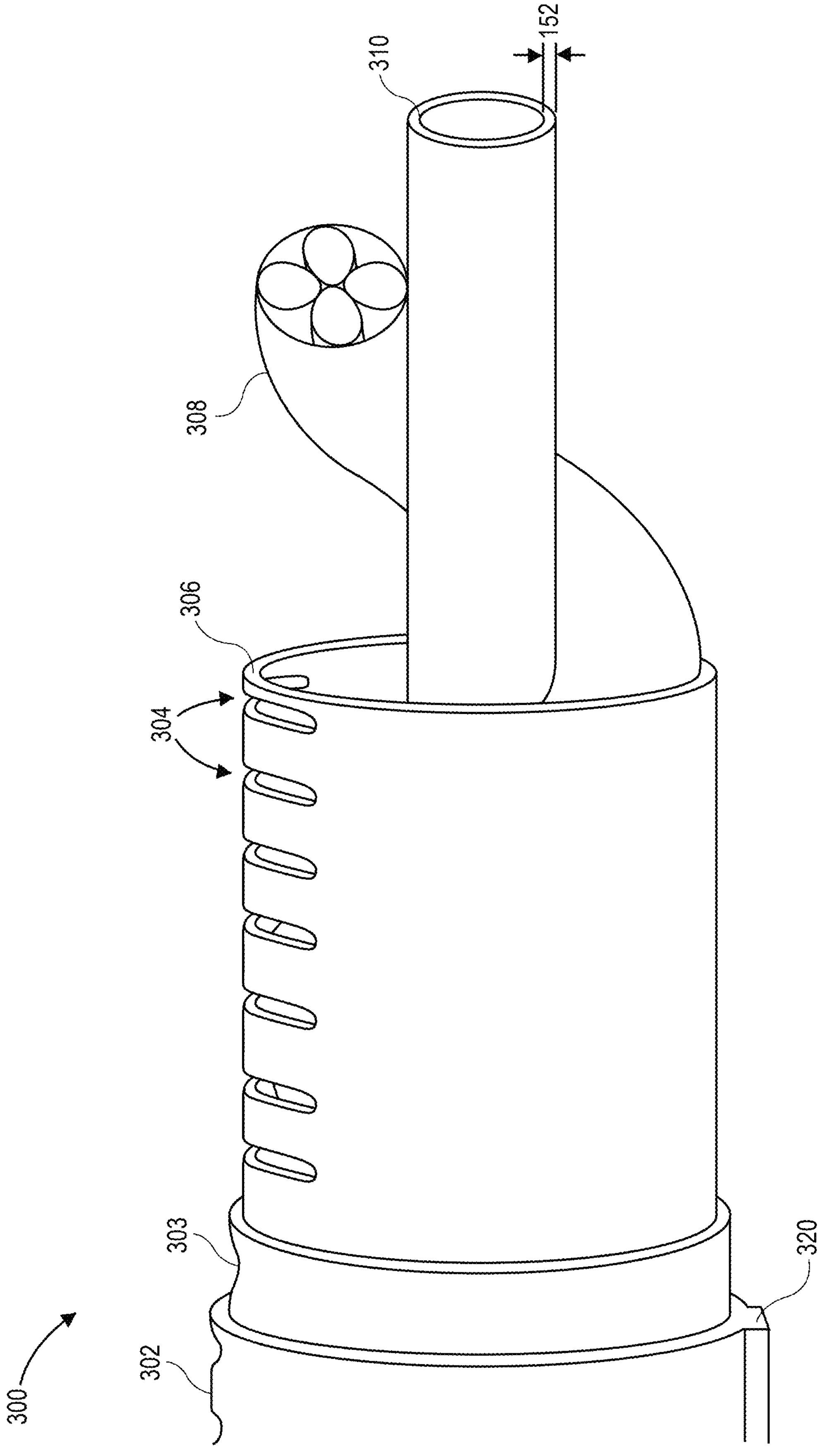
FIG. 3 is a cut-away perspective view of a foil shielded radiating coaxial cable in accordance with an embodiment.

FIG. 3 is a cut-away perspective view of a foil shielded radiating coaxial cable 300. Hollow center conductor 310 has wall thickness 152. Center conductor 310 is helically wrapped with four-ply fiberglass yarn 308. Relatively thick metal foil outer conductor 306 surrounds yarn 308 and center conductor 310. The yarn keeps the center conductor centered within outer conductor 306.

Slots 304 in outer conductor 306 run through a chord of the outer conductor's circumference and are spaced evenly. The slots allow RF signals to emanate or enter the dielectric region between the center and outer conductors from the top direction. Formed by laser cutting of the foil before rolling, slots 304 are tuned to one or more particular frequencies of interest for the radiating cable.

Ceramifiable silicone rubber inner jacket 303 encases foil outer conductor 308. In the event of a fire, the ceramifiable silicone rubber solidifies and forms a protective, firm layer surrounding the outer conductor, thereby preventing a short in the event the coaxial cable rests on a metallic surface and the outer jacket burns away. In some embodiments, a ceramic fiber wrap inner jacket is employed instead of, or in addition to, the ceramifiable silicone rubber jacket.

In embodiments where the inner jacket is a fiber wrap, the inner jacket can include glass, such as a glass substrate, glass or ceramic particles, or any other suitable insulating layer. In an example, a suitable fiber wrap may be a multi-ply tape with mica as a constituent mineral within the tape. In some embodiments, the fiber wrap may include alkaline earth silicate (AES) wool as an AES wool inner jacket.

Low smoke zero halogen (LSZH) outer jacket 302 covers and protects inner jacket 303. Its smooth surface allows the cable to slide more easily through walls and conduits. The outer jacket can be made of cross-linked, irradiated polyolefin and can be colored in order to stand out from other non-emergency cables. Other materials can be used for an outer jacket, such as polyvinyl chloride (PVC), thermoplastic elastomers, thermoset polyolefins, or other cable jacketing materials.

Embossed longitudinal line 320 is formed in outer jacket and is aligned opposite (i.e., 180 degrees opposite) slots 304.

Figure 4:
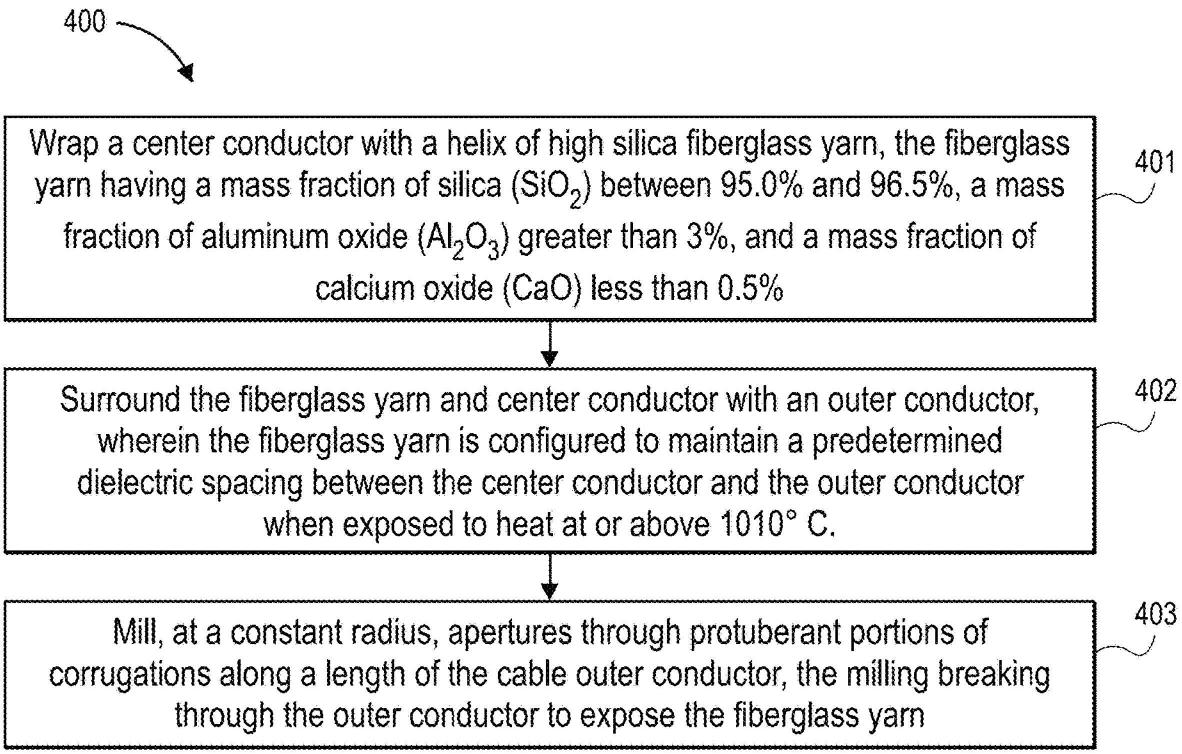
FIG. 4 is a flowchart in accordance with an embodiment.

FIG. 4 is a flowchart of a process 400 in accordance with an embodiment. In operation 401, a center conductor is wrapped with a helix of high silica fiberglass yarn, the fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%. In operation 402, the fiberglass yarn and center conductor are surrounded with an outer conductor, wherein the fiberglass yarn is configured to maintain a predetermined dielectric spacing between the center conductor and the outer conductor when exposed to heat at or above 1010° C. In operation 403, apertures are milled at a constant radius from the cable center point through protuberant portions of corrugations along a length of the cable outer conductor, the milling breaking through the outer conductor to expose the fiberglass yarn.

In some embodiments, the outer conductor could have had its apertures formed before its surrounding the fiberglass yarn and center conductor, and they could have been dye punched or laser cut.

Figure 5:
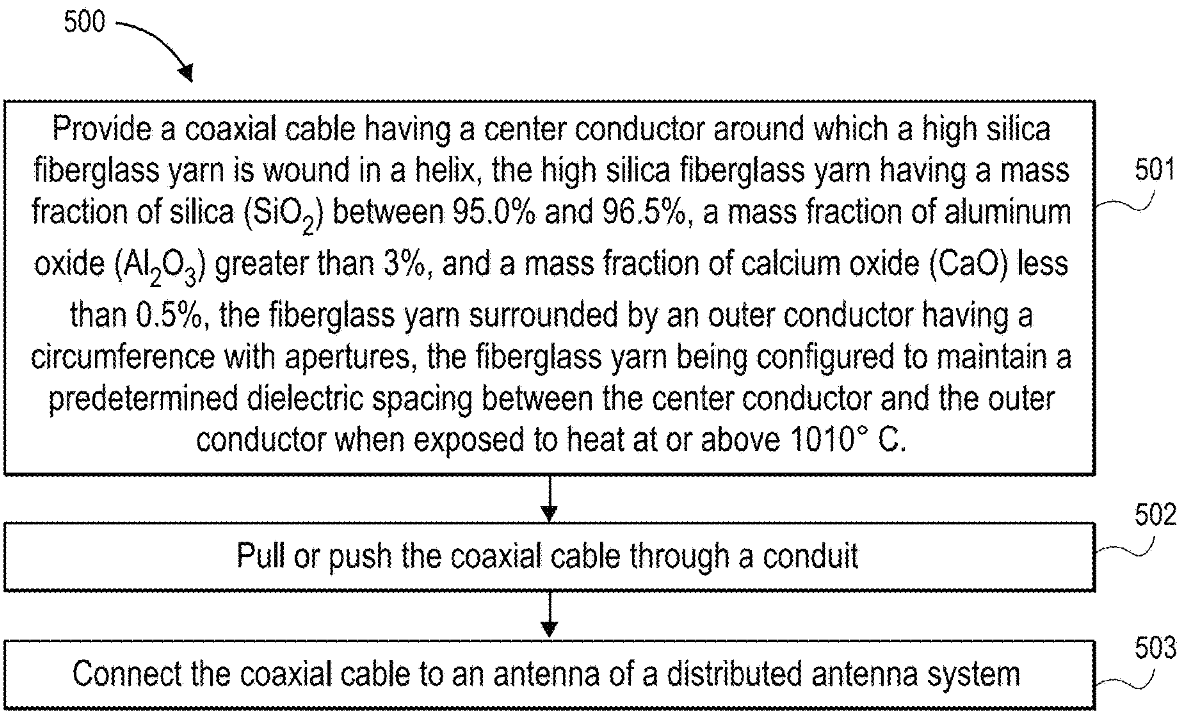
FIG. 5 is a flowchart in accordance with an embodiment.

FIG. 5 is a flowchart of a process 500 in accordance with an embodiment. In operation 501, a coaxial cable is provided having a center conductor around which a high silica fiberglass yarn is wound in a helix, the high silica fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%, the fiberglass yarn surrounded by an outer conductor having a circumference with apertures, the fiberglass yarn being configured to maintain a predetermined dielectric spacing between the center conductor and the outer conductor when exposed to heat at or above 1010° C. In operation 502, the coaxial cable is pulled or pushed through a conduit. In operation 503, the coaxial cable is connected to an antenna of a distributed antenna system.

Figure 6:
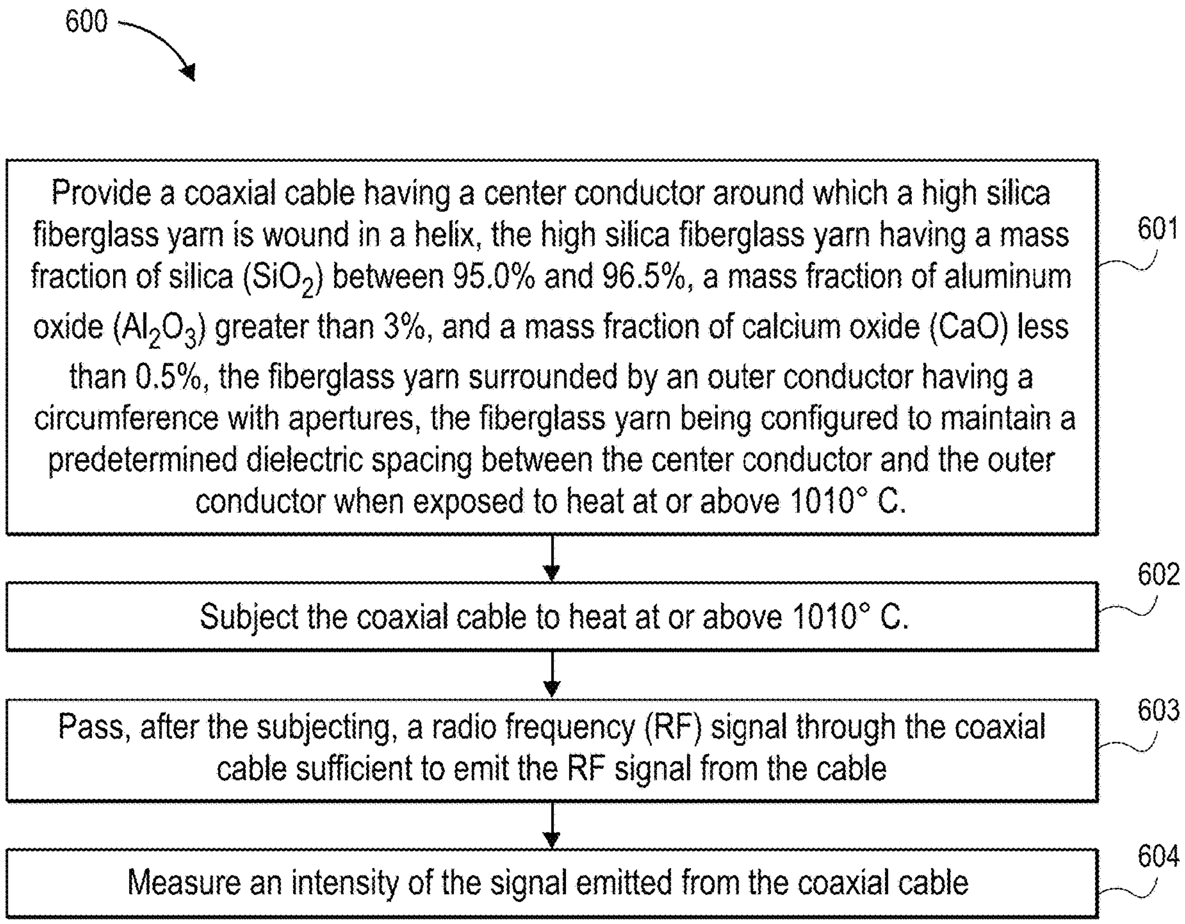
FIG. 6 is a flowchart in accordance with an embodiment.

FIG. 6 is a flowchart of a process 600 in accordance with an embodiment. In operation 601, a coaxial cable is provided having a center conductor around which a high silica fiberglass yarn is wound in a helix, the high silica fiberglass yarn having a mass fraction of silica ($SiO_2$) between 95.0% and 96.5%, a mass fraction of aluminum oxide ($Al_2O_3$)

greater than 3%, and a mass fraction of calcium oxide (CaO) less than 0.5%, the fiberglass yarn surrounded by an outer conductor having a circumference with apertures, the fiberglass yarn being configured to maintain a predetermined dielectric spacing between the center conductor and the outer conductor when exposed to heat at or above 1010° C. In operation 602, the coaxial cable is subject to heat at or above 1010° C. In operation 603, a radio frequency (RF) signal is passed through the coaxial cable sufficient to emit the RF signal from the radiating cable. In operation 604, an intensity of the signal emitted from the coaxial cable is measured.

Although specific embodiments of the invention have been described, various modifications, alterations, alternative constructions, and equivalents are also encompassed within the scope of the invention. Embodiments of the present invention are not restricted to operation within certain specific environments, but are free to operate within a plurality of environments. Additionally, although method embodiments of the present invention have been described using a particular series of and steps, it should be apparent to those skilled in the art that the scope of the present invention is not limited to the described series of transactions and steps.

Further, while embodiments of the present invention have been described using a particular combination of hardware, it should be recognized that other combinations of hardware are also within the scope of the present invention.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A fire resistant radiating coaxial cable apparatus comprising:
- a center conductor;
- an outer conductor having a circumference with apertures, the outer conductor surrounding the center conductor; and
- a high silica fiberglass yarn between the center conductor and the outer conductor, the fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%, the fiberglass yarn being configured to maintain a predetermined dielectric spacing between the center conductor and the outer conductor when exposed to heat at or above 1010° C.

2. The apparatus of claim 1 wherein the fiberglass yarn is wrapped in a helix around the center conductor.

3. The apparatus of claim 2 wherein the helix has an average helix angle of less than 60°.

4. The apparatus of claim 1 wherein the yarn fills less than half of a volume between the center conductor and the outer conductor.

5. The apparatus of claim 4 wherein the yarn fills less than a third of the volume between the center conductor and the outer conductor.

6. The apparatus of claim 1 wherein the yarn has two or more plies.

7. The apparatus of claim 1 wherein the yarn is a braided yarn.

8. The apparatus of claim 1 wherein the fiberglass yarn directly touches the center conductor or the outer conductor.

9. The apparatus of claim 1 wherein the high silica fiberglass yarn has a composition weight percentage of:
- (a) $Na_2O$=0.0564%±0.0056%
- (b) MgO=0.110%±0.011%
- (c) $Al_2O_3$=3.55%±0.36%
- (d) $SiO_2$=96.0%±1.0%
- (e) CaO=0.116%±0.012%
- (f) $Fe_2O_3$=0.164%±0.016%
- (g) $ZrO_2$=0.0301±0.0030%.

10. The apparatus of claim 1 wherein the outer conductor is corrugated, the apertures having been produced by milling, at a constant radius, protuberant portions of corrugations along a length of the cable, the milling breaking through the outer conductor.

11. The apparatus of claim 1 wherein the outer conductor is a metal foil.

12. The apparatus of claim 1 wherein the outer conductor is a loose braid, wherein the apertures are between metal strands of the loose braid.

13. The apparatus of claim 1 further comprising:
- a ceramifiable silicone rubber inner jacket or a ceramic fiber wrap inner jacket surrounding the outer conductor.

14. The apparatus of claim 13 further comprising:
- a smooth outer jacket surrounding the inner jacket.

15. The apparatus of claim 14, wherein the outer jacket includes an embossing or engraving aligned with the apertures.

16. The apparatus of claim 1 wherein the apertures were laser cut.

17. A fire resistant coaxial cable apparatus comprising:
- a center conductor;
- an outer conductor surrounding the center conductor; and
- a high silica fiberglass yarn wrapped in a helix between the center conductor and the outer conductor, the fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%, the fiberglass yarn being configured to maintain a predetermined dielectric spacing between the center conductor and the outer conductor when exposed to heat at or above 1010° C.,
- wherein the fiberglass yarn fills less than half of a volume between the center conductor and the outer conductor.

18. The apparatus of claim 17 wherein the outer conductor has corrugations with apertures, the apertures having been produced by milling, at a constant radius, protuberant portions of corrugations along a length of the cable, the milling breaking through the outer conductor.

19. A method of manufacturing a fire resistant coaxial cable, the method comprising:
- wrapping a center conductor with a helix of high silica fiberglass yarn, the fiberglass yarn having a mass fraction of silica ($SiO_2$) between 95.0% and 96.5%, a mass fraction of aluminum oxide ($Al_2O_3$) greater than 3%, and a mass fraction of calcium oxide (CaO) less than 0.5%; and
- surrounding the fiberglass yarn and center conductor with an outer conductor, wherein the fiberglass yarn is configured to maintain a predetermined dielectric spacing between the center conductor and the outer conductor when exposed to heat at or above 1010° C.

20. The method of claim 19 wherein the outer conductor is corrugated, the method further comprising:

milling, at a constant radius, apertures through protuberant portions of corrugations along a length of the cable, the milling breaking through the outer conductor.

* * * * *